(12) United States Patent
Sung et al.

(10) Patent No.: US 12,034,191 B2
(45) Date of Patent: Jul. 9, 2024

(54) FUEL CELL POWER CONTROL SYSTEM AND METHOD

(71) Applicants: Hyundai Motor Company, Seoul (KR); Kia Corporation, Seoul (KR)

(72) Inventors: Byung Jun Sung, Anyang-si (KR); Sang Pil Jang, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/815,262

(22) Filed: Jul. 27, 2022

(65) Prior Publication Data

US 2023/0163332 A1    May 25, 2023

(30) Foreign Application Priority Data

Nov. 25, 2021    (KR) .................. 10-2021-0164714

(51) Int. Cl.
| | |
|---|---|
| *H01M 8/04858* | (2016.01) |
| *B60L 7/18* | (2006.01) |
| *B60L 58/40* | (2019.01) |
| *H01M 8/04537* | (2016.01) |

(52) U.S. Cl.
CPC ... *H01M 8/04888* (2013.01); *H01M 8/04567* (2013.01); *H01M 8/04873* (2013.01); *B60L 7/18* (2013.01); *B60L 58/40* (2019.02); *B60L 2210/10* (2013.01); *H01M 2220/20* (2013.01); *H01M 2250/20* (2013.01)

(58) Field of Classification Search
CPC ......... H01M 8/04888; H01M 8/04567; H01M 8/04873; H01M 2220/20; H01M 2250/20; B60L 7/18; B60L 58/40; B60L 2210/10
See application file for complete search history.

(56) References Cited

U.S. PATENT DOCUMENTS

| | | |
|---|---|---|
| 8,531,053 B2 | 9/2013 | Choi |
| 2011/0111318 A1 | 5/2011 | Bernard |

FOREIGN PATENT DOCUMENTS

| | | |
|---|---|---|
| JP | 2002058113 A | 2/2002 |
| JP | 3906925 B2 | 4/2007 |
| JP | 4026013 B2 | 12/2007 |
| JP | 5488097 B2 | 5/2014 |
| JP | 6520105 B2 | 5/2019 |
| KR | 20190051329 A | 5/2019 |

*Primary Examiner* — Adam A Arciero
(74) *Attorney, Agent, or Firm* — MCDONNELL BOEHNEN HULBERT & BERGHOFF LLP

(57) ABSTRACT

Proposed is a fuel cell power control system. A fuel cell generates electric power. A load unit is electrically connected to the fuel cell. A DC/DC converter is disposed between the fuel cell and the load unit to convert the electric power between a low side of the DC/DC converter electrically connected to the fuel cell and a high side of the DC/DC converter electrically connected to the load unit. A battery is electrically connected to the high side of the DC/DC converter to be parallel to the load unit. A controller monitors a voltage of the load unit, the battery, or the high side of the DC/DC converter, and controls the electric power input to the load unit or output from the load unit in accordance with the monitored voltage.

5 Claims, 5 Drawing Sheets

FUEL CELL POWER CONTROL SYSTEM AND METHOD

CROSS REFERENCE TO RELATED APPLICATIONS

The present application claims priority to Korean Patent Application No. 10-2021-0164714, filed Nov. 25, 2021, the entire contents of which are incorporated herein for all purposes by this reference.

TECHNICAL FIELD

The present disclosure relates generally to a fuel cell power control system and method that maintain the voltage of a fuel cell power circuit, to which a fuel cell stack, a battery, and a load unit are connected, at a predetermined level.

BACKGROUND

A fuel cell is a cell directly converting chemical energy generated by oxidation into electrical energy. The fuel cell is fundamentally similar to a chemical cell in that oxidation and reduction reactions are used. However, unlike the chemical cell in which a cell reaction is performed within a closed cell system, the fuel cell is characterized in that a reactant is continuously supplied from an external source and a reaction product is continuously removed from a cell system. Recently, a fuel cell power generation system is being put into practical use. Since the reaction product of the fuel cell is pure water, research for using the fuel cell as an energy source of an eco-friendly vehicle is being actively undertaken.

A fuel cell system includes a fuel cell stack generating electrical energy through a chemical reaction, an air supply unit supplying the air to an air electrode (or a cathode) of the fuel cell stack, and a fuel supply unit supplying hydrogen to a hydrogen electrode (or an anode) of the fuel cell stack. That is, the air containing oxygen is supplied to the cathode of the fuel cell stack, whereas hydrogen is supplied to the anode of the fuel cell stack.

A proton exchange membrane/polymer electrolyte membrane fuel cell generates electricity through a chemical reaction of oxygen and hydrogen and additionally produces heat and water. The proton exchange membrane/polymer electrolyte membrane fuel cell has the following chemical formula:

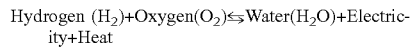

Hydrogen $(H_2)$+Oxygen$(O_2)$⇌Water$(H_2O)$+Electricity+Heat

In a commercial vehicle requiring high energy density due to the heavy weight and the long travel distance thereof, a fuel cell system is emerging as a solution, since it is difficult to meet the requirements of a vehicle using a battery alone.

A drive system and other electric systems of a commercial vehicle respectively use a high capacity system set to a voltage range which is relatively high, and the voltage range of the battery is applied in compliance with the relatively high voltage range. Here, the fuel cell generally uses a stack outputting a relatively low voltage and a DC/DC converter for boosting an output voltage of the fuel cell, since, for example, it is difficult to package the stack, the size of which increases to increase an output voltage, and common use of components is difficult.

The DC/DC converter disposed between the fuel cell and a load unit should be configured such that the voltage of the high side is maintained to be constantly higher than the voltage of the lower side. In contrast, in the event of a voltage reversal in which the voltage of the high side is lower than the lower side, a current is bypassed from the low side to the high side, thereby damaging the DC/DC converter.

In order to overcome these problems, there has been used a system that has an increased number of battery modules positioned at the high side to increase the minimum voltage of the high side to be higher than the maximum voltage of the fuel cell positioned at the low side. However, there are problems in that changes in the voltage due to the deterioration of the battery increase, or the maximum voltage of the battery exceeds the maximum voltage of the DC/DC converter due to an instantaneous increase in the voltage of the battery during the regenerative braking of the load unit.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a fuel cell power control system configured to control regenerative braking power of a load unit so that a voltage of a high side of a DC/DC converter does not exceed a maximum allowable voltage of the DC/DC converter.

In order to achieve the above objective, according to one aspect of the present disclosure, there is provided a fuel cell power control system including: a fuel cell generating electric power; a load unit electrically connected to the fuel cell; a DC/DC converter disposed between the fuel cell and the load unit and configured to convert the electric power between a low side of the DC/DC converter electrically connected to the fuel cell and a high side of the DC/DC converter electrically connected to the load unit; a battery electrically connected to the high side of the DC/DC converter to be parallel to the load unit; and a controller monitoring a voltage of the load unit, the battery, or the high side of the DC/DC converter, and controlling the electric power input to the load unit or output from the load unit in accordance with the monitored voltage.

The controller may control the electric power input to the load unit or output from the load unit so that the monitored voltage is maintained at a voltage equal to or lower than the maximum allowable voltage of the DC/DC converter.

When the monitored voltage is equal to or higher than a first predetermined voltage lower than the maximum allowable voltage of the DC/DC converter, the controller may increase the electric power input to the load unit or reduces the electric power output from the load unit so as to reduce electric power charged in the battery.

The load unit may include a regenerative motor, and the controller may control regenerative braking power of the load unit in accordance with the monitored voltage.

When the monitored voltage increases, the controller may control the load unit so as to reduce the regenerative braking power of the load unit.

When the monitored voltage is equal to or higher than the first predetermined voltage lower than the maximum allowable voltage of the DC/DC converter, the controller may increase the electric power input to the load unit or reduce the electric power output from the load unit so as to reduce the electric power charged in the battery.

When the monitored voltage is higher than the first predetermined voltage and equal to or higher than the second predetermined voltage lower than the maximum allowable voltage of the DC/DC converter, the controller may control the load unit so that a regenerative braking torque of the load unit is 0.

Also provided is a fuel cell power control method including the steps: converting, by a DC/DC converter, electric power between a low side of the DC/DC converter connected to a fuel cell and a high side of the DC/DC converter connected to a battery and a load unit; monitoring a voltage of the high side of the DC/DC converter, or a voltage of the load unit or the battery connected to the high side of the DC/DC converter; and controlling the electric power input to the load unit or output from the load unit in accordance with the monitored voltage.

The step of controlling the electric power may include controlling the electric power input to the load unit or output from the load unit so that the monitored voltage is maintained at a voltage equal to or lower than the maximum allowable voltage of the DC/DC converter.

The fuel cell power control method may further include, before the step of controlling the electric power, a step of comparing the monitored voltage with a first predetermined voltage lower than the maximum allowable voltage of the DC/DC converter. In the step of controlling the electric power, when the monitored voltage is equal to or higher than the first predetermined voltage, the electric power input to the load unit may be increased or the electric power output from the load unit may be reduced so that the electric power charged in the battery is reduced. The load unit may include a motor capable of regenerative braking, and the step of controlling the electric power may include controlling the regenerative braking power of the load unit in accordance with the monitored voltage.

When the monitored voltage increases, the step of controlling the electric power may include controlling the load unit so that the regenerative braking power of the load unit is reduced.

The fuel cell power control method may further include, before the step of controlling the electric power, a step of comparing the monitored voltage with the first predetermined voltage lower than the maximum allowable voltage of the DC/DC converter. When the monitored voltage is equal to or higher than the first predetermined voltage, the step of controlling the electric power may include increasing the electric power input to the load unit or reducing the electric power output from the load unit so that the electric power charged in the battery is reduced.

The fuel cell power control method may further include, before the step of controlling the electric power, a step of comparing the monitored voltage with a second predetermined voltage that is lower than the maximum allowable voltage of the DC/DC converter while being higher than the first predetermined voltage. When the monitored voltage is equal to or higher than the second predetermined voltage, the step of controlling the electric power may control the load unit so that a regenerative braking torque of the load unit is 0.

According to the fuel cell power control system and method of the present disclosure, it is possible to prevent the voltage of the high side of the DC/DC converter from exceeding the maximum allowable voltage of the DC/DC converter while preventing voltage reversal in the DC/DC converter.

Consequently, it is possible to improve the endurance of the DC/DC converter and prevent expensive electric components from being broken.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
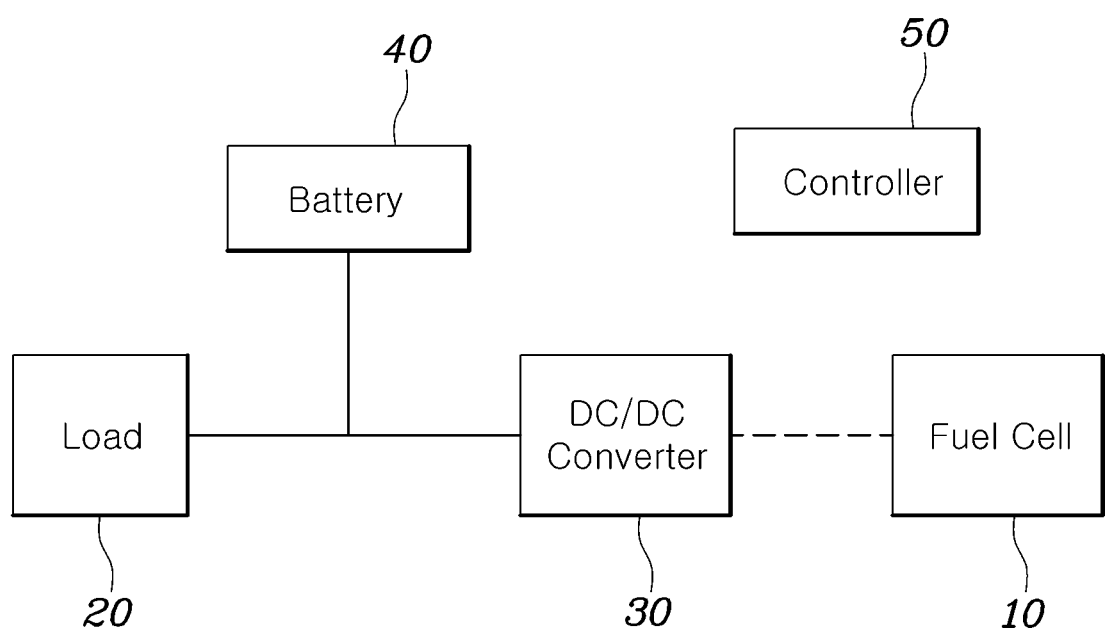
FIG. 1 is a block diagram illustrating the configuration of a fuel cell power control system according to an embodiment of the present disclosure.

Specific structural and functional descriptions of embodiments of the present disclosure disclosed herein are only for illustrative purposes of the embodiments of the present disclosure. The present disclosure may be embodied in many different forms without departing from the spirit and significant characteristics of the present disclosure. Therefore, the embodiments of the present disclosure are disclosed only for illustrative purposes and should not be construed as limiting the present disclosure.

Reference will now be made in detail to various embodiments of the present disclosure, specific examples of which are illustrated in the accompanying drawings and described below, since the embodiments of the present disclosure can be variously modified in many different forms. While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents, and other embodiments that may be included within the spirit and scope of the present disclosure.

It will be understood that, although the terms "first", "second", etc., may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled", "connected", or "linked" to another element, it can be directly coupled or connected to the other element or intervening elements may be present therebetween. In contrast, it should be understood that when an element is referred to as being "directly coupled", "directly connected", or "directly connected" to another element, there are no intervening elements present. Other expressions that explain the relationship between elements, such as "between", "directly between", "adjacent to", or "directly adjacent to" should be construed in the same way.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprise", "include", "have", etc., when used in this specification, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments of the present disclosure will be described in detail with reference to the accompanying drawings. Throughout the drawings, the same reference numerals will refer to the same or like parts.

FIG. 1 is a block diagram illustrating the configuration of a fuel cell power control system according to an embodiment of the present disclosure.

Referring to FIG. 1, the fuel cell power control system according to an embodiment of the present disclosure includes: a fuel cell 10 generating electric power; a load unit 20 electrically connected to the fuel cell 10; a DC/DC converter 30 disposed between the fuel cell 10 and the load unit 20 and configured to convert the electric power between a low side 32 of the DC/DC converter electrically connected to the fuel cell 10 and a high side 31 of the DC/DC converter electrically connected to the load unit 20; a battery 40 electrically connected to the high side 31 of the DC/DC converter 30 to be parallel to the load unit 20; and a controller monitoring a voltage of the load unit 20, the battery 40, or the high side 31 of the DC/DC converter 30, and controlling the electric power input to the load unit 20 or output from the load unit 20 on the basis of the monitored voltage.

The fuel cell 10 may be a stack of fuel cells 10, i.e., a stack including a plurality of fuel cells 10 which are stacked on each other. Each of the plurality of cells 10 included in the fuel cell stack may generate electric power using hydrogen supplied through a hydrogen electrode (or an anode) and air containing oxygen supplied through an oxygen electrode (or a cathode).

The stack of fuel cells 10 may include a membrane electrode assembly (MEA) therein.

The load unit 20 is a power consuming device electrically connected to the fuel cell 10, and may be supplied with electric power generated by the fuel cell 10. In particular, the load unit 20 may receive most of required electric power from the fuel cell 10, and the battery 40 may function as a buffer to supplement an insufficient amount of electric power or store an excess amount of electric power.

In an embodiment, the load unit 20 may be a drive motor of a vehicle, an air blower or an air compressor configured to supply the air to the stack of fuel cells 10, a coolant pump configured to supply coolant to the stack of fuel cells 10, or a power consuming device such as a COD resistor.

In particular, the load unit 20 may be a device of a high capacity system used in commercial vehicles. Thus, the operating voltage of the load unit 20 may be higher than the output voltage of the fuel cell 10.

The battery 40 is electrically connected to the high side 31 of the DC/DC converter 30. In particular, the battery 40 may be connected to the high side 31 to be parallel to the load unit 20, thereby being electrically connected to the fuel cell 10. Consequently, the battery 40 may assist in electric power output from the fuel cell 10 and supplied to the load unit 20 or store an excess amount of electric power therein.

The battery 40 may be comprised of a plurality of cells to charge or discharge electric power therein or therefrom. In addition, at the high side 31, the input voltage or the output voltage of the electrically connected battery 40 may be higher than the output voltage of the fuel cell 10.

Figure 2:
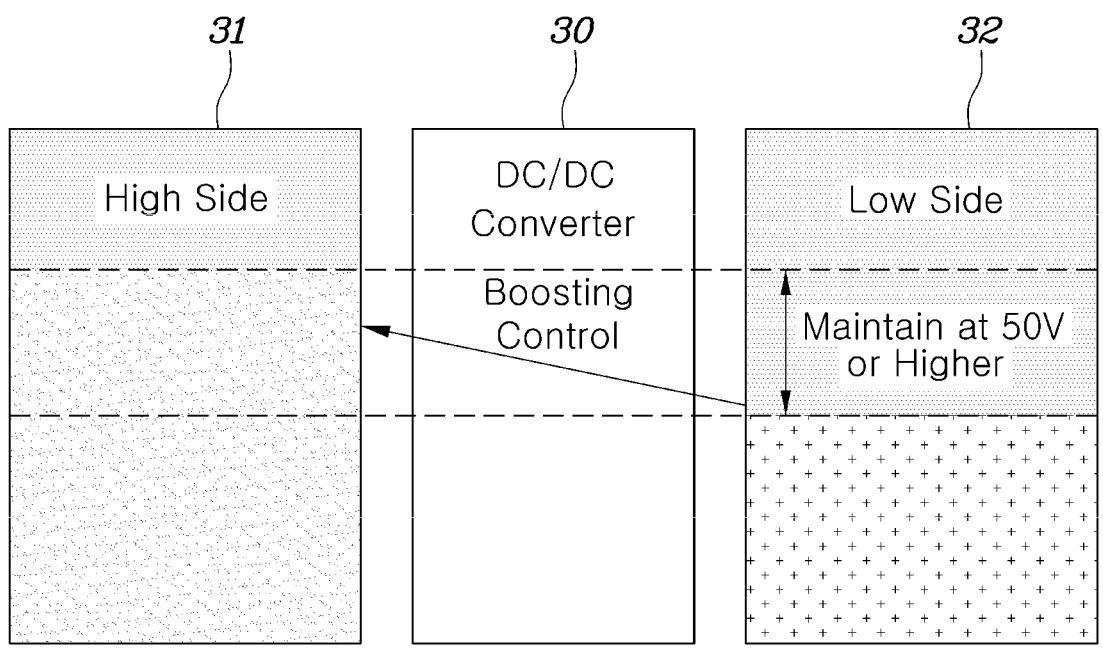
FIG. 2 is a diagram illustrating normal converting of the DC/DC converter according to an embodiment of the present disclosure.
Figure 3:
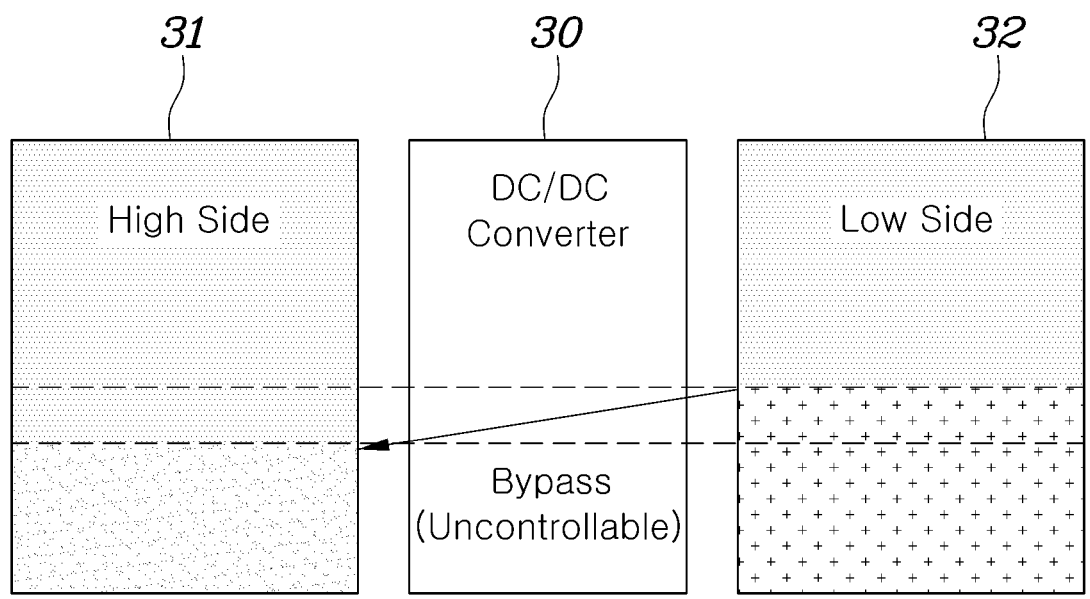
FIG. 3 is a diagram illustrating reverse converting of the DC/DC converter according to an embodiment of the present disclosure.

FIG. 2 is a diagram illustrating normal converting of the DC/DC converter 30 according to an embodiment of the present disclosure, and FIG. 3 is a diagram illustrating reverse converting of the DC/DC converter 30 according to an embodiment of the present disclosure.

Referring to FIGS. 2 and 3, the DC/DC converter 30 may be disposed between the fuel cell 10 and the load unit 20 to boost the voltage of the low side 32, i.e., a relatively low voltage, and supply the increased voltage to the high side 31 electrically connected to the load unit 20.

The voltage of the high side 31 of the DC/DC converter 30 should be maintained always higher than the voltage of the low side 32 by at least 50 V.

However, in the event of voltage reversal in which the voltage of the low side 32 is higher than the voltage of the high side 31 as illustrated in FIG. 3, a current flowing from the low side 32 to the high side 31 bypasses instead of being regulated. When an excessive amount of current flows, the DC/DC converter 30 may be damaged.

In order to prevent this problem, each of the minimum values of the operating voltage of the load unit 20 and the input and output voltages of the battery 40 may be set to be higher than the maximum value of the output voltage of the fuel cell 10. In this case, there are problems in that the number of modules of the battery 40 should be increased, the entire voltage range of the battery 40 is increased, the maximum voltage of the battery 40 may be higher than the maximum allowable voltage of the DC/DC converter 30.

In addition, when the battery 40 degrades, the internal resistance is increased, changes in the voltage due to charge and discharge are also increased. In particular, when the temperature decreases and the state of charge (SOC) increases, the voltage of the battery 40 may be instantaneously increased, thereby exceeding the maximum allowable voltage of the DC/DC converter 30. In addition, although it is possible to prevent the voltage from increasing by limiting charged electric power according to the SOC of the battery 40, the accuracy of control is reduced due to the deterioration of the battery 40 and changes in the temperature.

Thus, when the voltage of the battery 40 is maintained high, it is necessary to monitor and control the voltage so that the voltage does not increase to a predetermined voltage or more. The present disclosure is intended to prevent the voltage of the high side 31 DC/DC converter 30 from increasing to a predetermined voltage or higher by controlling the regenerative braking power of the load unit 20.

The controller according to an exemplary embodiment of the present disclosure may be realized by a non-volatile memory (not shown) and a processor (not shown), wherein the memory stores data regarding an algorithm configured to control the operations of a variety of components of a vehicle or software instructions for executing the algorithm, and the processor is configured to perform the following operations using the data stored in the memory. Here, the memory and the processor may be implemented as chips, respectively. Alternatively, the memory and the processor may be implemented as a single integrated chip, and the processor may be one or more processors.

The controller may monitor the voltage of the load unit 20, the battery 40, or the high side 31 of the DC/DC converter 30. In an embodiment, the controller may monitor the voltage of the load unit 20 or the battery 40 in real time, or receive voltage information from a device monitoring the voltage of the load unit 20 or the battery 40. Alternatively, the controller may be connected to the DC/DC converter 30 to monitor the voltage of the high side 31.

Here, all of the voltage of the load unit 20, the voltage of the battery 40, and the voltage of the high side 31 of the DC/DC converter 30 may be assumed to be the same.

The controller may control electric power input to the load unit 20 or output from the load unit 20 on the basis of the voltage of load unit 20, the battery 40, or the high side 31 of the DC/DC converter 30.

In an embodiment, when the voltage of load unit 20, the battery 40, or the high side 31 of the DC/DC converter 30 monitored increases, the controller may maintain or reduce the voltage of the high side 31 of the DC/DC converter 30 by increasing the electric power input to the load unit 20 or reducing the electric power output from the load unit 20.

In an embodiment, the controller may control the electric power input to the load unit 20 or output from the load unit 20 so that the monitored voltage is maintained at a voltage equal to or lower than the maximum allowable voltage of the DC/DC converter 30.

In particular, the controller may control the load unit 20 to increase the electric power input to the load unit 20 or reduce the electric power output from the load unit 20 so that the monitored voltage does not exceed the maximum allowable voltage of the DC/DC converter 30.

In another embodiment, when the monitored voltage is equal to or higher than a first predetermined voltage lower than the maximum allowable voltage of the DC/DC converter 30, the controller may increase the electric power input to the load unit 20 or reduce the electric power output from the load unit 20 so as to reduce electric power charged in the battery 40.

Figure 4:
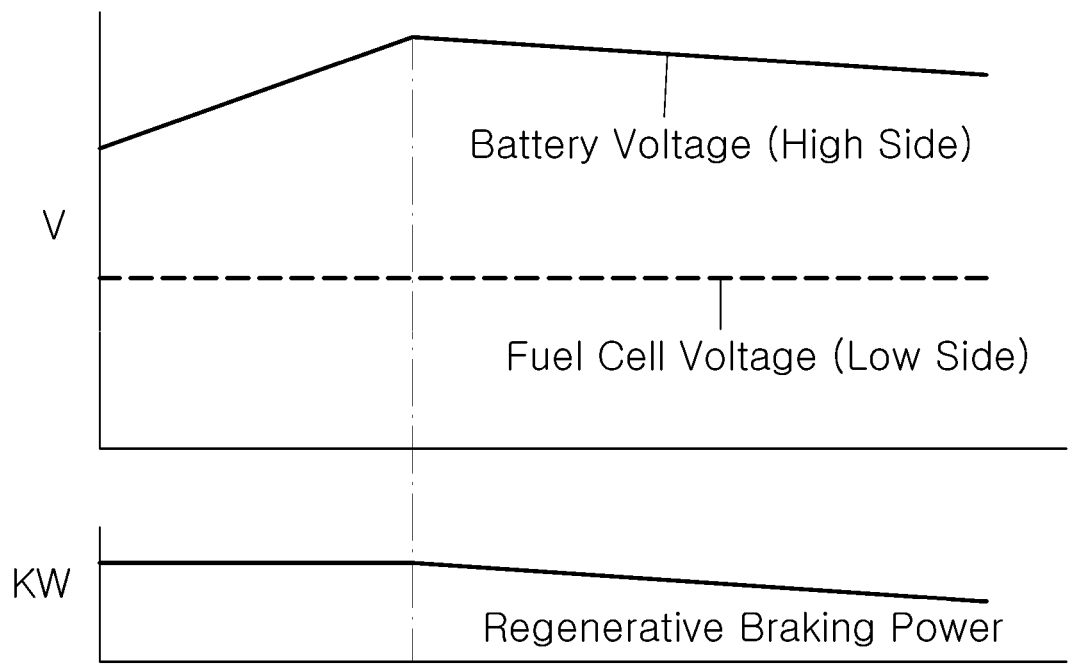
FIG. 4 illustrates regenerative braking power according to both-side voltages of the DC/DC converter according to an embodiment of the present disclosure.

FIG. 4 illustrates regenerative braking power according to both-side voltages of the DC/DC converter according to an embodiment of the present disclosure.

Referring to FIG. 4, the load unit 20 is a regenerative motor, and the controller may control the regenerative braking power of the load unit 20 on the basis of the monitored voltage.

In an embodiment, the load unit 20 may be a drive motor driving a vehicle, a compressor motor, or a pump motor. In the event of braking which decelerates the rotation speed, the motor may perform regenerative braking to generate electric power. The electric power output from the motor during the regenerative braking may charge the battery 40.

Here, when the battery 40 is charged with the electric power generated by the regenerative braking of the motor, the voltage of the high side 31 of the DC/DC converter 30 may be increased. The controller may control the regenerative braking power of the load unit 20 on the basis of the voltage of the high side 31 of the DC/DC converter 30.

In particular, when the monitored voltage increases, the controller may control the load unit 20 so as to reduce the regenerative braking power of the load unit 20.

In an embodiment, when the monitored voltage is equal to or lower than the first predetermined voltage lower than the maximum allowable voltage, the controller may increase the electric power input to the load unit 20 or reduce the electric power output from the load unit 20 so as to reduce the electric power charged in the battery 40.

The first predetermined voltage may be a voltage set previously to be lower than the maximum voltage of the DC/DC converter 30 by 50 V. The controller may generate the maximum of the regenerative braking power of the load unit 20 only when the voltage of the high side 31 of the DC/DC converter 30 is lower than the first predetermined voltage and limit the regenerative braking power of the load unit 20 only when the monitored voltage of the high side 31 of the DC/DC converter 30 is equal to or higher than the first predetermined voltage.

In an embodiment, the controller may continuously reduce the regenerative braking power of the load unit 20 by a predetermined power value a. In particularly, the controller may reduce the regenerative braking power of the load unit 20 until the electric power charged in the battery 40 is 0. In another embodiment, the controller may continuously reduce the regenerative braking power of the load unit 20 by the predetermined power value until the monitored voltage of the high side 31 of the DC/DC converter 30 is reduced.

When the monitored voltage is higher than the first predetermined voltage and equal to or higher than the second predetermined voltage lower than the maximum allowable voltage of the DC/DC converter 30, the controller may control the load unit 20 so that the regenerative braking torque of the load unit 20 is 0.

Here, the second predetermined voltage may be a predetermined voltage that is close to the maximum allowable voltage of the DC/DC converter 30 while being higher than the first predetermined voltage. When the monitored voltage of the high side 31 of the DC/DC converter 30 is close to the maximum allowable voltage, the controller may control the load unit 20 so that the regenerative braking torque of the load unit 20 is 0. Accordingly, the controller completely stops the regenerative braking.

Figure 5:
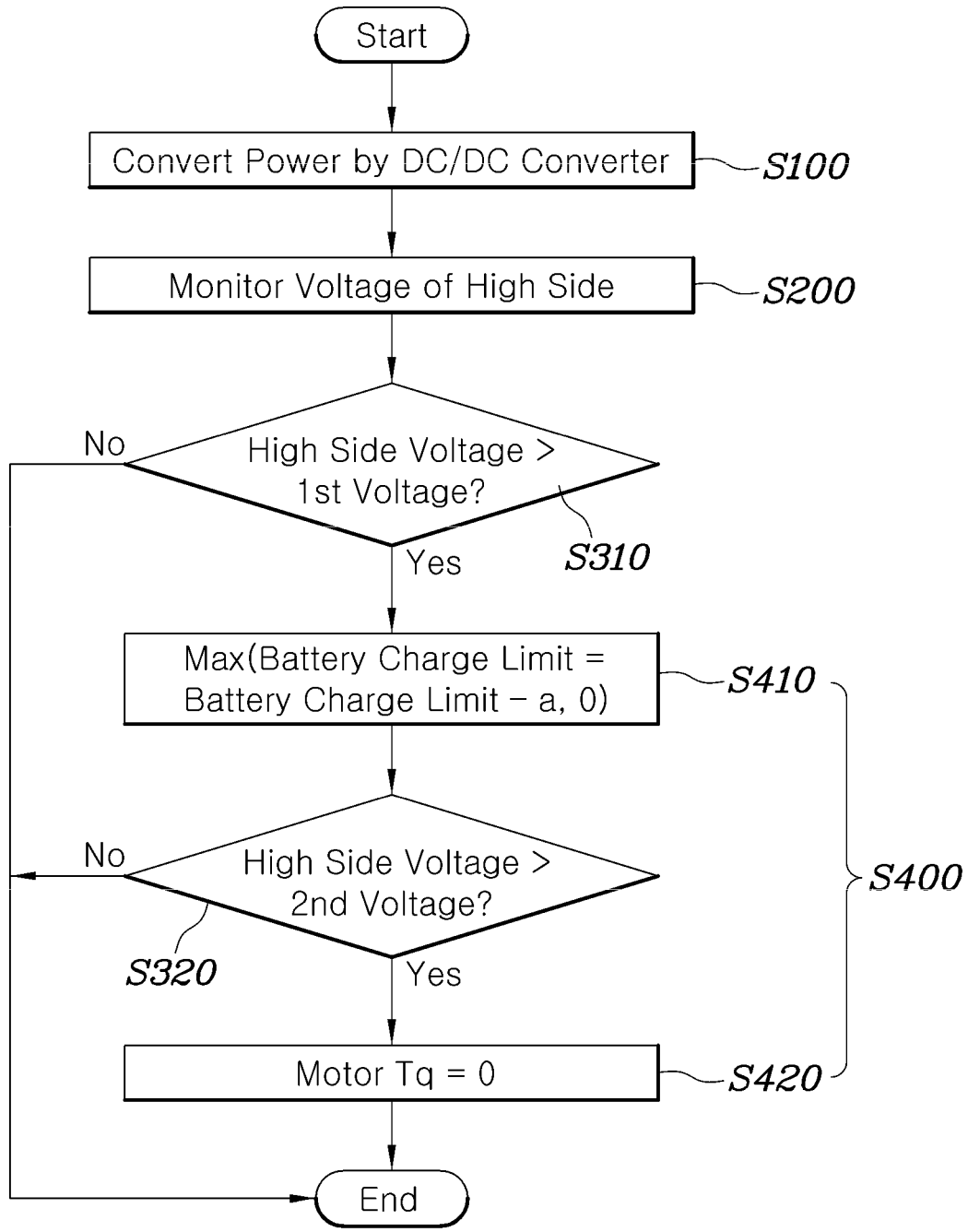
FIG. 5 is a flowchart illustrating a fuel cell power control method according to an embodiment of the present disclosure.

FIG. 5 is a flowchart illustrating a fuel cell power control method according to an embodiment of the present disclosure.

The fuel cell power control method according to an embodiment of the present disclosure may include: step S100 of converting, by the DC/DC converter 30, electric power between the low side 32 connected to the fuel cell 10 and the high side 31 connected to the battery 40; step S200 of monitoring the voltage of the high side 31 of the DC/DC converter 30, or the voltage of the load unit 20 or the battery 40 connected to the high side 31 of the DC/DC converter 30; and step S400 of controlling the electric power input to the load unit 20 or output from the load unit 20 on the basis of the monitored voltage.

The step S100 of converting the electric power may boost, by the DC/DC converter 30, a voltage so as to continuously supply the electric power from the fuel cell 10 to the load unit 20 and the battery 40.

The step S400 of controlling the electric power may control the electric power input to the load unit 20 or output from the load unit 20 so that the monitored voltage is maintained at a voltage equal to or lower than the maximum allowable voltage of the DC/DC converter 30.

The fuel cell power control method may further include, before step S410 (S400) of controlling the electric power, step S310 of comparing the monitored voltage with a first predetermined voltage lower than the maximum allowable voltage of the DC/DC converter 30. In the step S410 of controlling the electric power, when the monitored voltage is equal to or higher than the first predetermined voltage, the electric power input to the load unit 20 may be increased or the electric power output from the load unit 20 may be reduced so that the electric power charged in the battery 40 is reduced.

The load unit 20 may be a motor capable of regenerative braking. In the step S400 of controlling the electric power, the regenerative braking power of the load unit 20 may be controlled on the basis of the monitored voltage.

In the step S400 of controlling the electric power, when the monitored voltage increases, the load unit 20 may be controlled so that the regenerative braking power of the load unit 20 is reduced.

The method may further include, before the step S410 of controlling the electric power, step S310 of comparing the monitored voltage with the first predetermined voltage lower than the maximum allowable voltage of the DC/DC converter 30. In the step S410 of controlling the electric power, when the monitored voltage is equal to or higher than the first predetermined voltage, the electric power input to the load unit 20 may be increased or the electric power output from the load unit 20 may be reduced so that the electric power charged in the battery 40 is reduced.

The method may further include, before step S420 (S400) of controlling the electric power, step S320 of comparing the monitored voltage with a second predetermined voltage that is lower than the maximum allowable voltage of the DC/DC converter 30 while being higher than the first predetermined voltage. In the step S420 (S400) of controlling the electric power, when the monitored voltage is equal to or higher than the second predetermined voltage, the load unit 20 may be controlled so that the regenerative braking torque of the load unit 20 is 0.

Although the exemplary embodiments of the present disclosure have been described for illustrative purposes, those skilled in the art will appreciate that various modifications, additions, and substitutions are possible, without departing from the scope and spirit of the present disclosure as disclosed in the accompanying claims.

What is claimed is:

1. A fuel cell power control system comprising:
a fuel cell generating electric power;
a load unit electrically connected to the fuel cell;
a DC/DC converter disposed between the fuel cell and the load unit and configured to convert the electric power between a low side of the DC/DC converter electrically connected to the fuel cell and a high side of the DC/DC converter electrically connected to the load unit;
a battery electrically connected to the high side of the DC/DC converter to be parallel to the load unit; and
a controller monitoring a voltage of the load unit, the battery, or the high side of the DC/DC converter, and controlling the electric power input to the load unit or output from the load unit in accordance with the monitored voltage,
wherein the load unit comprises a regenerative motor, and the controller controls regenerative braking power of the load unit in accordance with the monitored voltage, and
wherein, when the monitored voltage is equal to or higher than a first predetermined voltage lower than the maximum allowable voltage of the DC/DC converter, the controller increases the electric power input to the load unit or reduces the electric power output from the load unit so as to reduce the electric power charged in the battery.

2. The fuel cell power control system of claim 1, wherein the controller controls the electric power input to the load unit or output from the load unit so that the monitored voltage is maintained at a voltage equal to or lower than the maximum allowable voltage of the DC/DC converter.

3. The fuel cell power control system of claim 1, wherein, when the monitored voltage is equal to or higher than a first predetermined voltage lower than the maximum allowable voltage of the DC/DC converter, the controller increases the electric power input to the load unit or reduces the electric power output from the load unit so as to reduce electric power charged in the battery.

4. The fuel cell power control system of claim 1, wherein, when the monitored voltage increases, the controller controls the load unit so as to reduce the regenerative braking power of the load unit.

5. The fuel cell power control system of claim 1, wherein, when the monitored voltage is higher than the first predetermined voltage and equal to or higher than a second predetermined voltage lower than the maximum allowable voltage of the DC/DC converter, the controller controls the load unit so that a regenerative braking torque of the load unit is 0.

* * * * *